United States Patent
Zhang et al.

(10) Patent No.: US 8,593,149 B2
(45) Date of Patent: Nov. 26, 2013

(54) METHOD AND CIRCUITS FOR SHORT-CIRCUIT PROTECTION OF LED SYSTEMS

(76) Inventors: Zhengdong Zhang, Shanghai (CN); Jianbo Sun, Shanghai (CN); Li Zhang, Shanghai (CN); Yun Lu, Shanghai (CN); Xuguang Zhang, Shanghai (CN)

( * ) Notice: Subject to any disclaimer, the term of this patent is extended or adjusted under 35 U.S.C. 154(b) by 336 days.

(21) Appl. No.: 13/005,402

(22) Filed: Jan. 12, 2011

(65) Prior Publication Data

US 2011/0316543 A1  Dec. 29, 2011

(30) Foreign Application Priority Data

Jun. 25, 2010  (CN) .......................... 2010 1 0217885

(51) Int. Cl.
*G01R 31/00* (2006.01)
(52) U.S. Cl.
USPC ........................................................ 324/414
(58) Field of Classification Search
USPC ........................................................ 324/414
See application file for complete search history.

(56) References Cited

U.S. PATENT DOCUMENTS

| | | | | |
|---|---|---|---|---|
| 4,394,647 A * | 7/1983 | Van Dine | ...................... | 340/645 |
| 6,490,512 B1 * | 12/2002 | Niggemann | .................. | 701/29.1 |
| 8,044,667 B2 * | 10/2011 | Cortigiani et al. | ............ | 324/522 |
| 2007/0096746 A1 * | 5/2007 | Telefont | ........................ | 324/500 |
| 2007/0159750 A1 * | 7/2007 | Peker et al. | ................... | 361/93.1 |
| 2007/0195025 A1 * | 8/2007 | Korcharz et al. | ................ | 345/82 |
| 2008/0204029 A1 * | 8/2008 | Mihai et al. | ................... | 324/414 |
| 2009/0225021 A1 * | 9/2009 | Ye et al. | ......................... | 345/102 |
| 2010/0156324 A1 * | 6/2010 | Nagase et al. | ................. | 315/307 |
| 2010/0177127 A1 * | 7/2010 | Akiyama et al. | .............. | 345/690 |
| 2011/0062872 A1 * | 3/2011 | Jin et al. | ......................... | 315/122 |
| 2011/0089854 A1 * | 4/2011 | Yang et al. | ..................... | 315/291 |
| 2011/0266972 A1 * | 11/2011 | Ling | ............................. | 315/297 |

\* cited by examiner

*Primary Examiner* — Jermele M Hollington
*Assistant Examiner* — Demetrius Pretlow

(57) ABSTRACT

An embodiment of the present invention relates to a method for detection of short circuit conditions in an LED array having one or more LED strings, each of which includes one or more LED devices. The method includes determining a minimum voltage that is the lowest of voltages associated with cathode terminals of the one or more LED strings. The method also includes determining if said minimum voltage is between a lower limit voltage and an upper voltage limit. If said minimum voltage is between the lower limit voltage and the upper voltage limit, then a result of a short circuit testing can be considered valid. Here, the short circuit testing includes comparing a sampled voltage associated with a cathode voltage of one of the LED strings with a short-circuit reference voltage.

15 Claims, 7 Drawing Sheets

METHOD AND CIRCUITS FOR SHORT-CIRCUIT PROTECTION OF LED SYSTEMS

CROSS-REFERENCES TO RELATED APPLICATIONS

This application claims benefit and priority of Chinese Patent Application No. 201010217885.2, filed Jun. 25, 2010, commonly owned and incorporated herein by reference in its entirety for all purposes.

BACKGROUND OF THE INVENTION

The present invention relates to light-emitting diode (LED) systems. More particularly, embodiments of the invention relate to methods and circuits for short-circuit protection of LED systems.

As electronic products grow rapidly, LCD products, such as televisions and displays, etc., are becoming widespread. As a result, the need for LED backlight and the demand for LED and LED drivers are increasing. Many LED driver integrated circuits utilize multiple-path constant current control to achieve the desired current distribution. In order to obtain stability of system circuit and provide satisfactory current output to the LED, it is necessary to test the voltage conditions of serial LED arrays. The anode of a serial LED array is often connected to a relatively fixed high voltage, while the cathode is often connected to a current control unit. Therefore, testing can be carried out at the cathode of an LED array to determine whether a short-circuit condition exists in the LED array.

FIG. 1 illustrates a conventional LED lighting system including a multiple channel LED array. FIG. 1 shows an LED array 100 having multiple LED strings 110, each having a plurality of LED devices. A constant current controller 101 is connected to a cathode end of each LED string 110. A level shifter circuit 102 is also connected to each of the LED strings. An output of level shifter 102, designated as Vout, provides power to the anode end of each of the LED strings.

FIG. 2 illustrates a conventional method for testing for a short-circuit condition in an LED string. In this method, testing is carried out by sampling the voltage at the cathode terminal of an LED string. In FIG. 2, LEDX denotes a cathode end of an LED string No. X. A voltage Vs taken from a voltage divider formed by resistors R1 and R2 is used as a sampled voltage representing the voltage at LEDX. As shown, Vs is an input to comparator 210, which also has another input coupled to a reference voltage Vref. In this example, Vref is derived from power supply Vdd through a voltage divider formed by resistors Ra and Rb. The resistors and the reference voltage can be selected such that when Vs is higher than or equal to Vref, a short-circuit condition is determined to exist. At this time, the output of comparator 210, V1, will be at a high voltage, for example, to indicate the short-circuit condition.

Although widely used, conventional LED short circuit testing methods, such as those described above, suffer from many limitations. These limitations tend to lead to unreliable testing results, as described in more detail below. Therefore, more efficient and cost-effective techniques for improving LED systems are highly desired.

BRIEF SUMMARY OF THE INVENTION

The present invention relates to light-emitting diode (LED) systems. More particularly, embodiments of the invention relate to methods and circuits for short-circuit protection of LED systems. Merely as examples, embodiments of the invention have been applied to detection of short-circuit conditions in LED lighting systems used in, e.g., backlight for LCD display systems. Conventional methods for detection of short-circuit conditions suffer unreliable testing results. For example, erroneous detection results can be caused by, for example, circuit startup condition, an open circuit in the LED string, or unstable conditions during LED light adjustment operations. Some embodiments of the invention provide techniques for more reliable detection of short-circuit conditions. But it is appreciated that embodiments of the invention have much broader range of applications.

An embodiment of the present invention relates to a method for detection of a short circuit condition in an LED array having one or more LED strings, each of which includes one or more LED devices. The method includes determining a minimum voltage that is the lowest of voltages associated with cathode terminals of the one or more LED strings. The method also includes determining if said minimum voltage is between a lower limit voltage and an upper voltage limit. If said minimum voltage is between the lower limit voltage and the upper voltage limit, then a result of a short circuit testing can be considered valid. Here, the short circuit testing includes comparing a sampled voltage associated with a cathode voltage of one of the LED strings with a short-circuit reference voltage.

In embodiments of the above method, the lower limit voltage and the upper limit voltage are associated with the range of voltages associated with the cathode terminals of the one or more LED strings when each of the LED strings is under a normal operating condition. In a specific embodiment, the lower limit voltage and the upper limit voltage can be determined by first setting a reference voltage equal to the least of LED cathode voltages when the LED strings are in a normal operating condition. Then, the lower limit voltage is set to be equal to the reference voltage minus a first offset voltage, and the higher limit voltage is set to be equal to the reference voltage plus a second offset voltage.

In another embodiment, determining the minimum voltage is carried out by a first circuit module that includes a plurality of input transistors, each of the input transistors having a control terminal configured for controlling a current flow between a first and a second current carrying terminals. The control terminal of each input transistors is configured for coupling to an LED string. The first circuit module also has an output transistor having a control terminal configured for controlling a current flow between a first and a second current-carrying terminals, the control terminal of the output transistor being coupled to the first terminals of the plurality of input transistors. A first current source is coupled to the second terminals of the plurality of input transistors, and a second current source is coupled to the first terminal of the output transistor. Moreover, the second terminal of the output transistor is configured to provide an output voltage associated with the minimum voltage of the voltages at the control terminals of the input transistors.

In another embodiment of the method, the short circuit testing also includes determining the sampled LED cathode voltage using a first resistive voltage divider circuit coupled to a cathode terminal of an LED string and determining the short-circuit reference voltage using a second resistive voltage divider circuit coupled to a voltage supply According to another embodiment of the present invention, a circuit for determining a short-circuit condition in one or more LED strings includes a first circuit module coupled to each of the one or more LED strings for determining a minimum voltage among voltages associated with the cathodes of the one or more LED strings. The circuit also has a second circuit module coupled to the first circuit module to receive the minimum voltage and for outputting an enable signal if the minimum voltage is between a lower limit voltage and an upper voltage limit. In addition, the circuit also has one or more test circuit modules, each of which is coupled to a corresponding LED string and also coupled to the second circuit module. Each of the test circuit modules is configured to test for a short circuit condition in the corresponding LED string if it receives the enable signal from the second circuit module.

In an embodiment of the above circuit, the first circuit module includes a plurality of input transistors, each of which has a control terminal configured for controlling a current flow between a first and a second current carrying terminals of the input transistor. The control terminal is also configured for coupling to the LED strings. The first circuit module also has an output transistor having a control terminal configured for controlling a current flow between a first and a second current carrying terminals of the output transistor. The control terminal of the output transistor is coupled to the first terminals of the plurality of input transistors. A first current source is coupled to the second terminals of the plurality of input transistors, and a second current source coupled to the first terminal of the output transistor. Moreover, the second terminal of the output transistor is configured to provide an output voltage associated with the minimum voltage among the voltages at the control terminals of the input transistors.

In some embodiments of the first circuit module, each of the input transistors includes a PNP bipolar transistor, and the output transistor includes an NPN bipolar transistor. In other embodiments, each of the input transistors includes an MOS transistor, and the output transistor includes an MOS transistor.

In another embodiment, the second circuit module includes a comparator circuit having an input terminal, a high voltage reference terminal, a low voltage reference terminal, and an output terminal. The comparator circuit is configured to output an enable signal at the output terminal, if a voltage at the input terminal has a magnitude between those at the high voltage reference terminal and low voltage reference terminals. In another embodiment, the lower limit voltage and the upper limit voltage are associated with the range of LED cathode voltages when each of the LED strings is under a normal operating condition.

In another embodiment, the above circuit also includes a third circuit module for determining the lower limit voltage and the upper limit voltage. The third circuit module is configured to determine a reference voltage that is equal to the least of LED cathode voltages when the LED strings are in a normal operating condition, set the lower limit voltage equal to the reference voltage minus a first offset voltage, and set the higher limit voltage equal to the reference voltage plus a second offset voltage. In a specific embodiment, the first circuit module and the third circuit module are an integrated in a single circuit module.

In another embodiment, each of the one or more test circuit modules includes a first resistive voltage divider circuit for coupling to a cathode terminal of an LED string and for providing a sampled LED cathode voltage and a second resistive voltage divider circuit for coupling to a voltage supply and providing a short-circuit reference voltage. Each test module also has a comparator circuit that includes a first input terminal for receiving the sampled LED cathode voltage, a second input terminal for receiving the short-circuit reference voltage, and a control terminal for receiving an enable signal. Each test circuit module also has an output terminal for outputting a short-circuit indicating signal if the enable signal is received and if the sampled LED cathode voltage is higher than the short-circuit voltage.

According to another embodiment, an LED display system includes an LED array with one or more LED strings. Each of the LED strings has a plurality of LED devices. A first circuit module is coupled to each of the one or more LED strings for determining a minimum voltage among voltages associated with the cathodes of the one or more LED strings. A second circuit module is coupled to the first circuit module to receive the minimum voltage and for outputting an enable signal if the minimum voltage is between a lower limit voltage and an upper voltage limit. The system also includes one or more test circuit modules, each coupled to a corresponding LED string and also coupled to the second circuit module, each of the test circuit modules configured to test for a short circuit condition in the corresponding LED string if it receives the enable signal from the second circuit module.

In an embodiment of the above system, the first circuit module includes a plurality of input transistors, each of which having a control terminal configured for controlling a current flow between a first and a second current carrying terminals. The control terminal is configured for coupling to the LED strings. The first circuit module also has an output transistor having a control terminal configured for controlling a current flow between a first and a second current carrying terminal. The control terminal of the output transistor is coupled to the first terminals of the plurality of input transistors. Moreover, a first current source is coupled to the second terminals of the plurality of input transistors, and a second current source is coupled to the first terminal of the output transistor. In addition, the second terminal of the output transistor is configured to provide an output voltage associated with the minimum voltage associated with the voltages at the control terminals of the input transistors.

In another embodiment of the above system, the second circuit module includes a comparator circuit, which has an input terminal, a high voltage reference terminal, a low voltage reference terminal, and an output terminal. The comparator circuit is configured to output an enable signal at the output terminal, if a voltage at the input terminal has a magnitude between those at the high voltage reference terminal and low voltage reference terminal. In an embodiment, wherein the lower limit voltage and the upper limit voltage are associated with the range of LED cathode voltages when each of the LED strings is under a normal operating condition.

In another embodiment, the above system also has a third circuit module for determining the lower limit voltage and the upper limit voltage. The third circuit module is configured to determine a reference voltage that is equal to the least of LED cathode voltages when the LED strings are in a normal operating condition, set the lower limit voltage equal to the reference voltage minus a first offset voltage, and set the higher limit voltage equal to the reference voltage plus a second offset voltage.

In yet another embodiment of the above system, each of the one or more test circuit modules includes a first resistive voltage divider circuit for coupling to a cathode terminal of an LED string and for providing a sampled LED cathode voltage and a second resistive voltage divider circuit for coupling to a voltage supply and providing a short-circuit reference voltage. Each test circuit module includes a comparator circuit having a first input terminal for receiving the sampled LED cathode voltage, a second input terminal for receiving the short-circuit reference voltage, and a control terminal for receiving an enable signal. The comparator circuit also has an output terminal for outputting a short-circuit indicating signal if the enable signal is received and if the sampled LED cathode voltage is higher than the short-circuit voltage.

A further understanding of the nature and advantages of the present invention may be obtained by reference to the remaining portions of the specification and the drawings.

DETAILED DESCRIPTION OF THE INVENTION

Figure 1:
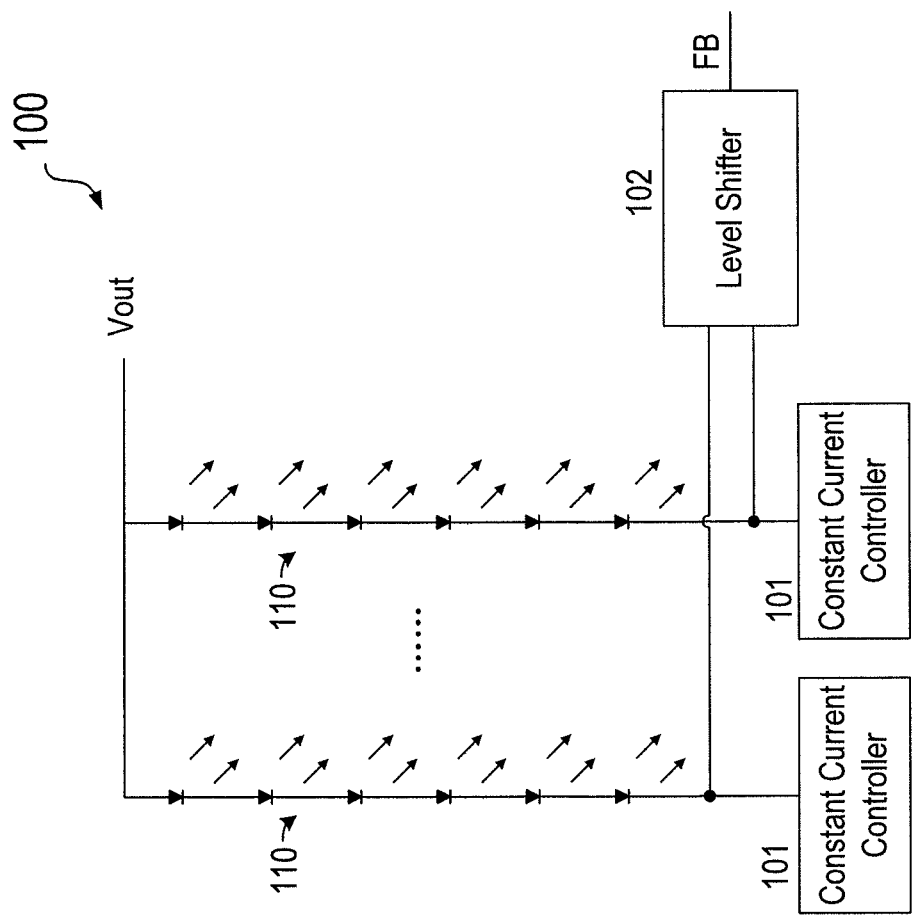
FIG. 1 illustrates a conventional LED lighting system including a multiple channel LED array.
Figure 2:
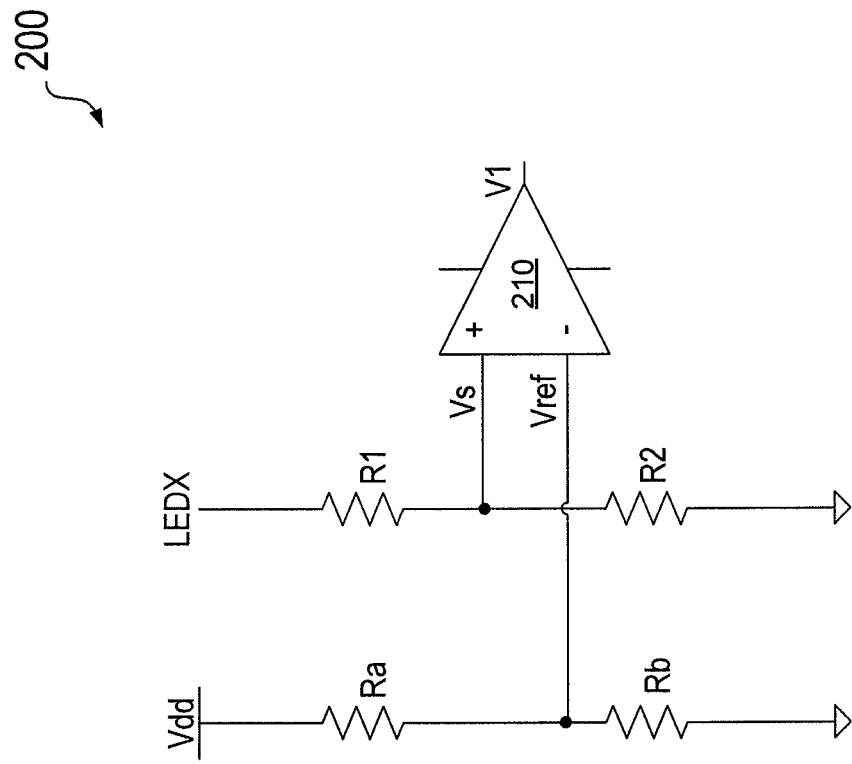
FIG. 2 illustrates a conventional method for testing for a short-circuit condition in an LED array.
Figure 3:
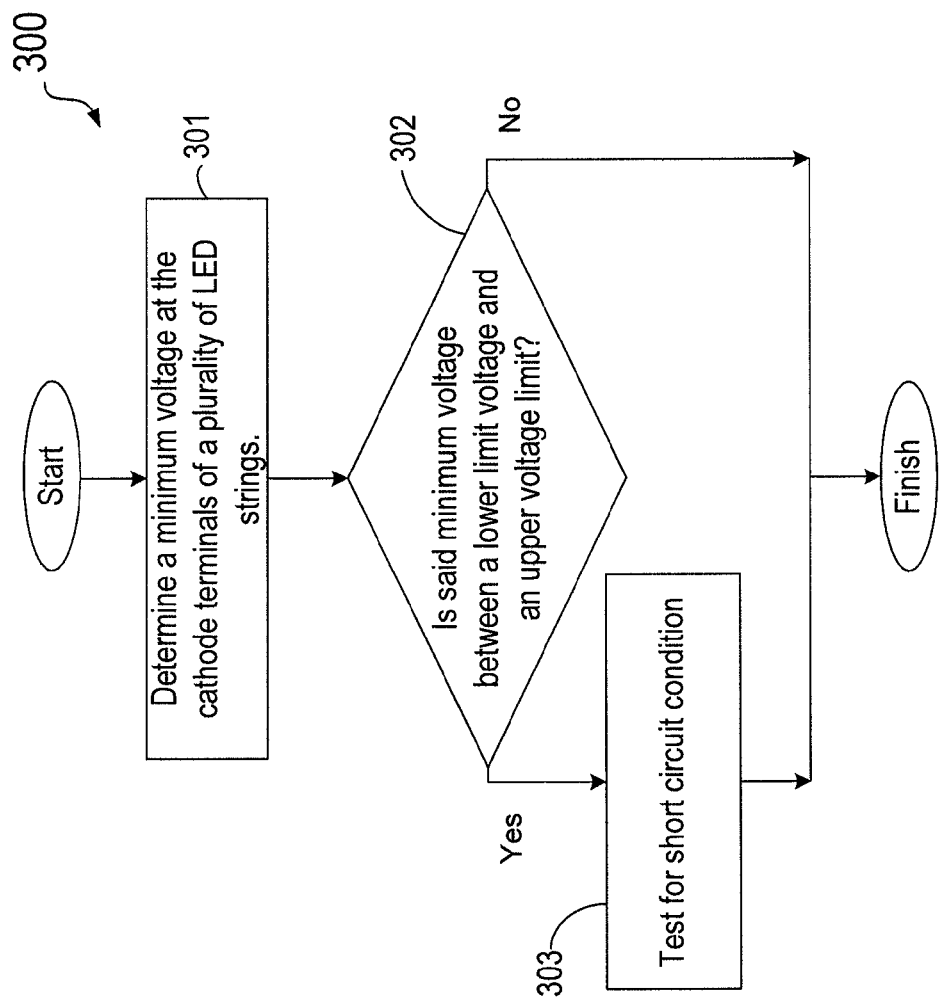
FIG. 3 is a simplified flow chart illustrating a method for testing for short circuit in an LED array.

FIG. 3 is a simplified flow chart illustrating a method 300 for testing for a short-circuit condition in an LED array according to an embodiment of the present invention.

301: Determining a minimum voltage at the cathode terminals of a plurality of LED strings.
302: Determining if said minimum voltage is between a lower limit voltage and an upper voltage limit.
303: If the above condition is met, then test for short circuit condition.

In an embodiment, the method also includes determining the lower voltage limit and the upper voltage limit. When all the LED strings in the LED array are working normally, the voltage at the cathode terminal of each LED string is measured. The lowest of these cathode terminal voltages is determined. In an embodiment, the method also includes determining appropriate values for the lower limit voltage and the upper limit voltage. This can be achieved, for example, by first determining a reference voltage that is equal to the least of LED cathode voltages when the LED strings are in a normal operating condition. Then the lower limit voltage can be set equal to the reference voltage minus a first offset voltage, and the higher limit voltage can be set equal to the reference voltage plus a second offset voltage. Of course, other variations of the limits can also be used. Depending on the embodiments, the lower and upper voltage limits can be determined based on the LED array design, or alternative, they can also be determined empirically.

Here, the LED array is considered to be working normally if the LED array is without a short circuit condition, an open circuit condition, is not going through a light adjustment operation, and is not in a startup stage. In a startup stage, Vout tends to be low, and the cathode terminal voltages are also low. Under this condition, results of short-circuit testing tend to be unreliable. This condition can be screened by limiting short-circuit testing only when the cathode voltages are above a lower voltage limit.

On the other hand, if an open circuit condition exists in one of the LED strings in the LED array, Vout may become high, and the power supply will be adjusting its output. Under this condition, results of short-circuit testing also tend to be unreliable. This condition can be screened by limiting short-circuit testing only when the cathode voltages are below a higher voltage limit.

Short-circuit testing may also be unreliable when the system is undergoing light adjustment. Under this condition, the system may turn off the constant current controller, causing the cathode voltages to be high. This condition can also be screened by limiting short-circuit testing only when the cathode voltages are below a higher voltage limit.

Figure 4:
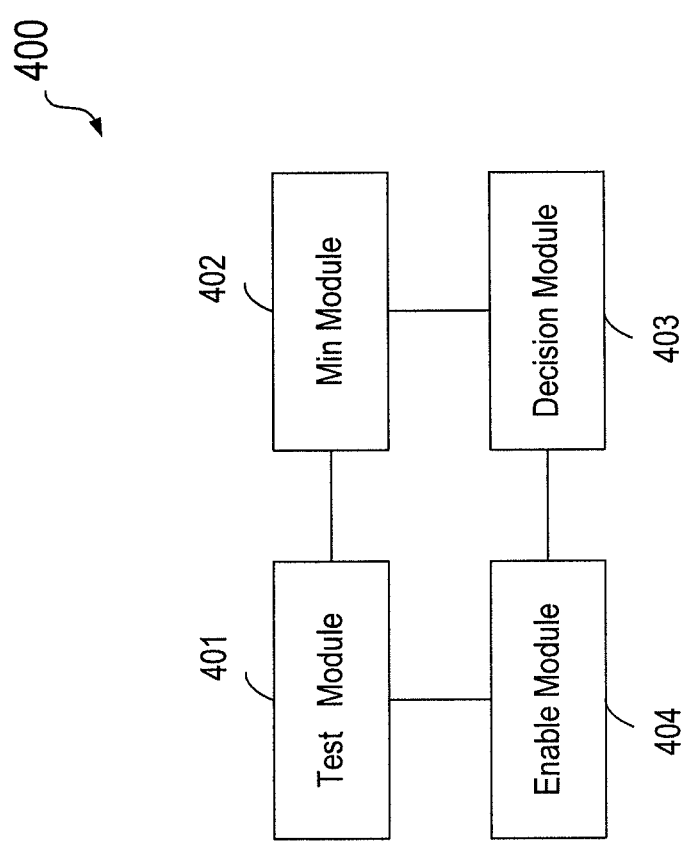
FIG. 4 is a simplified block diagram illustrating a test circuit 400 for LED array short circuit testing according to an embodiment of the present invention.

FIG. 4 is a simplified block diagram illustrating a test circuit 400 for LED array short circuit testing according to an embodiment of the present invention. As an example, test circuit 400 can be used to implement the method depicted in FIG. 3. As shown in FIG. 4, test circuit 400 includes a test module 401, a minimum circuit module 402, a decision module 403, and an enable module 404. Minimum circuit module 402 is configured for coupling to each of the one or more LED strings for determining a minimum voltage among voltages associated with the cathodes of the one or more LED strings. Decision module 403 and enable module 404 are coupled to minimum circuit module 402 to receive the minimum voltage and for outputting an enable signal if the minimum voltage is between a lower limit voltage and an upper voltage limit. Test circuit 400 can have one or more test circuit modules similar to test module 401 in FIG. 4. Each test module 401 is configured to be coupled to a corresponding LED string and also coupled to enable module 404 for receiving an enable signal. Test module 401 is configured to test for a short circuit condition in the corresponding LED string only when the enable signal is received.

Figure 5:
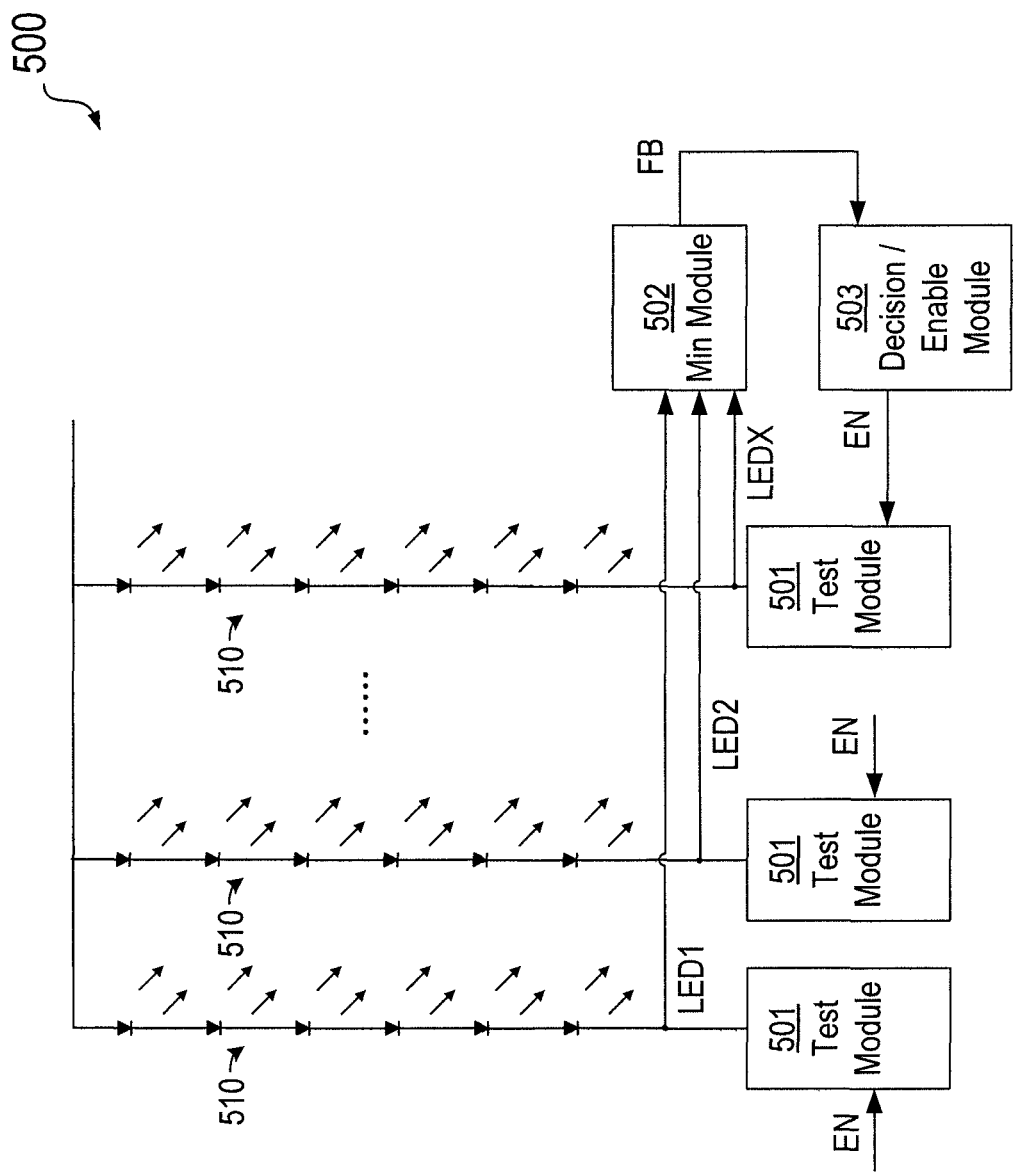
FIG. 5 is a simplified block diagram illustrating a system 500 for testing short circuit conditions in an LED array according to an embodiment of the present invention.

FIG. 5 is a simplified block diagram illustrating a system 500 for testing short circuit conditions in an LED array according to an embodiment of the present invention. As shown in FIG. 5, system 500 has an LED array that includes multiple LED strings 510, each of which includes a plurality of LED devices. Each LED string 510 is coupled to a test module 501 for testing for a short circuit condition in the LED string. As shown, each of the test modules 501 is coupled to a corresponding LED string and also coupled to Decision/Enable module 503. Each of the test circuit modules 502 is configured to test for a short circuit condition in the corresponding LED string if it receives the enable signal from Decision/Enable module 503. The cathode terminals of the LED strings, e.g., LED1, LED2, ..., and LEDX, are coupled to a Min module 502, which identifies the minimum of the voltages at these cathode terminals, designated here as signal FB. System 500 also includes a Decision/Enable module 503, which examines FB to determine whether a suitable condition for short circuit testing is met, and, if so, an enable signal EN is sent to test modules 501 for carrying out short circuit testing.

In FIG. 5, Decision/Enable module 503 performs similar functions as decision module 403 and enable module 404 in FIG. 4. Similarly, the function of Test modules 501 in FIG. 5 is similar to that of test module 401 in FIG. 4, and Min module 502 can be used as min module 402 in FIG. 4. In some embodiments, Min module 502, Decision/Enable module 503, and one or more Test modules 501 can be integrated in a single circuit module. The functions of these modules are described in more details below.

Figure 6:
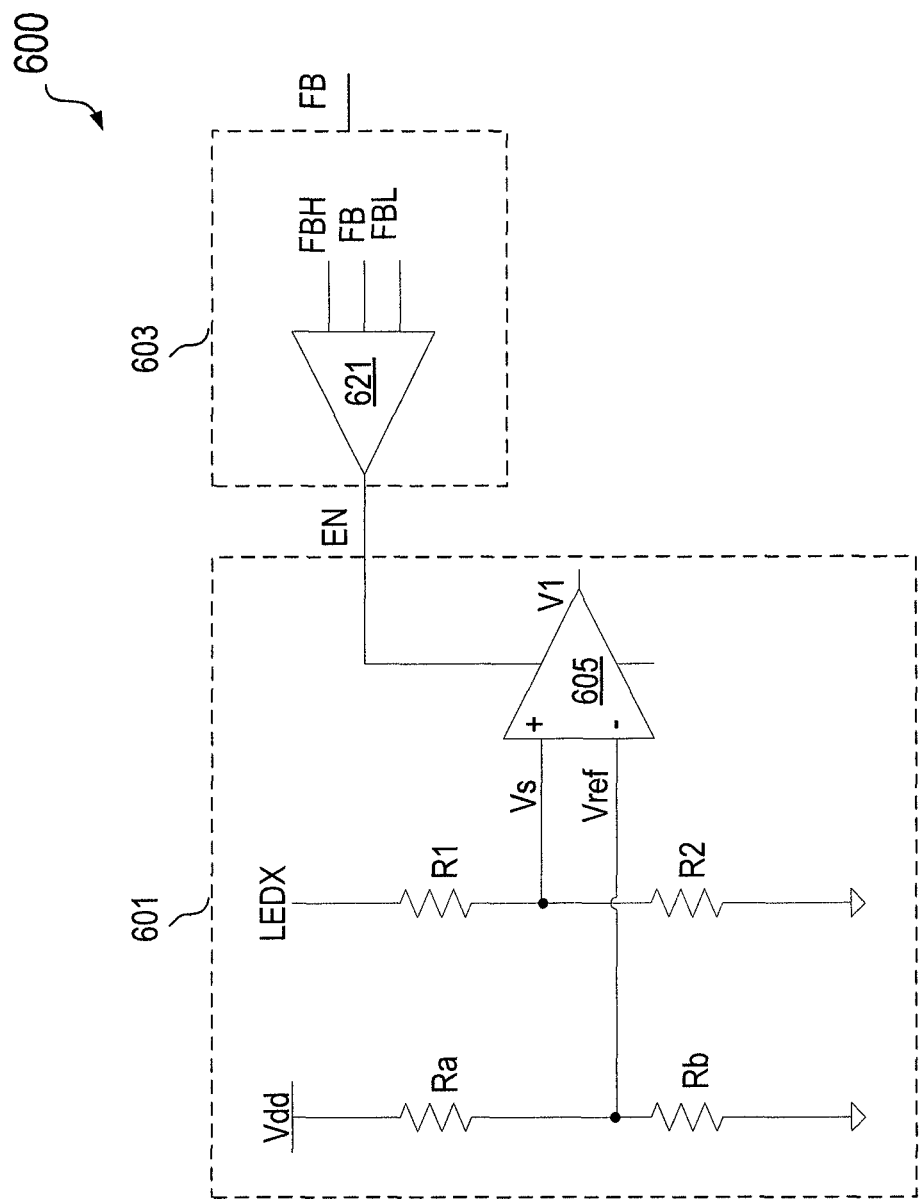
FIG. 6 is a simplified circuit diagram illustrating a test module and a decision module according to an embodiment of the present invention.

FIG. 6 is a simplified circuit diagram illustrating a test module 601 and a decision module 603 according to an embodiment of the present invention, which can be used as components for system 500 of FIG. 5 or circuit 400 of FIG. 4. For example, block 601 of FIG. 6 can be used as test circuit module 501 in FIG. 5 or test module 401 in FIG. 4.

As shown in FIG. 6, test circuit module 601 is configured for determining a short-circuit condition in an LED string, if it receives the enable signal EN. Circuit 601 includes a first resistive voltage divider circuit (R1 and R2) for coupling to a cathode terminal (LEDX) of an LED string and for providing a sampled LED cathode voltage Vs. A second resistive voltage divider circuit (Ra and Rb) is coupled to a voltage supply Vdd and provides a short-circuit reference voltage Vref. Test circuit module 601 also includes a comparator circuit 605, which has a first input terminal for receiving the sampled LED cathode voltage Vs and a second input terminal for receiving the short-circuit reference voltage Vref. Comparator circuit 605 also has a control terminal for receiving enable signal EN. Comparator circuit 605 further has an output terminal V1 for outputting a short-circuit indicating signal V1, if enable signal EN is received. In this example, short-circuit indicating signal V1 is at a high level, if the sampled LED cathode voltage Vs is higher than the short-circuit reference voltage Vref.

As shown in FIG. 6, circuit block 603 can be used in FIG. 4 to perform the functions of decision module 403 and enable module 404. Circuit block 603 can also be used in FIG. 5 as the decision/enable module 503. As shown in FIG. 6, circuit block 603 includes a comparator circuit 621 having an input terminal for receiving an input signal, e.g., FB, which is the output of a minimum circuit module. Comparator 621 also has a terminal for receiving a high voltage reference FBH and terminal for receiving a low voltage reference FBL. Comparator circuit 621 is configured to output an enable signal EN at an output terminal, if the voltage at the input terminal FB has a magnitude between FBL and FBH.

Figures 7A, 7B:
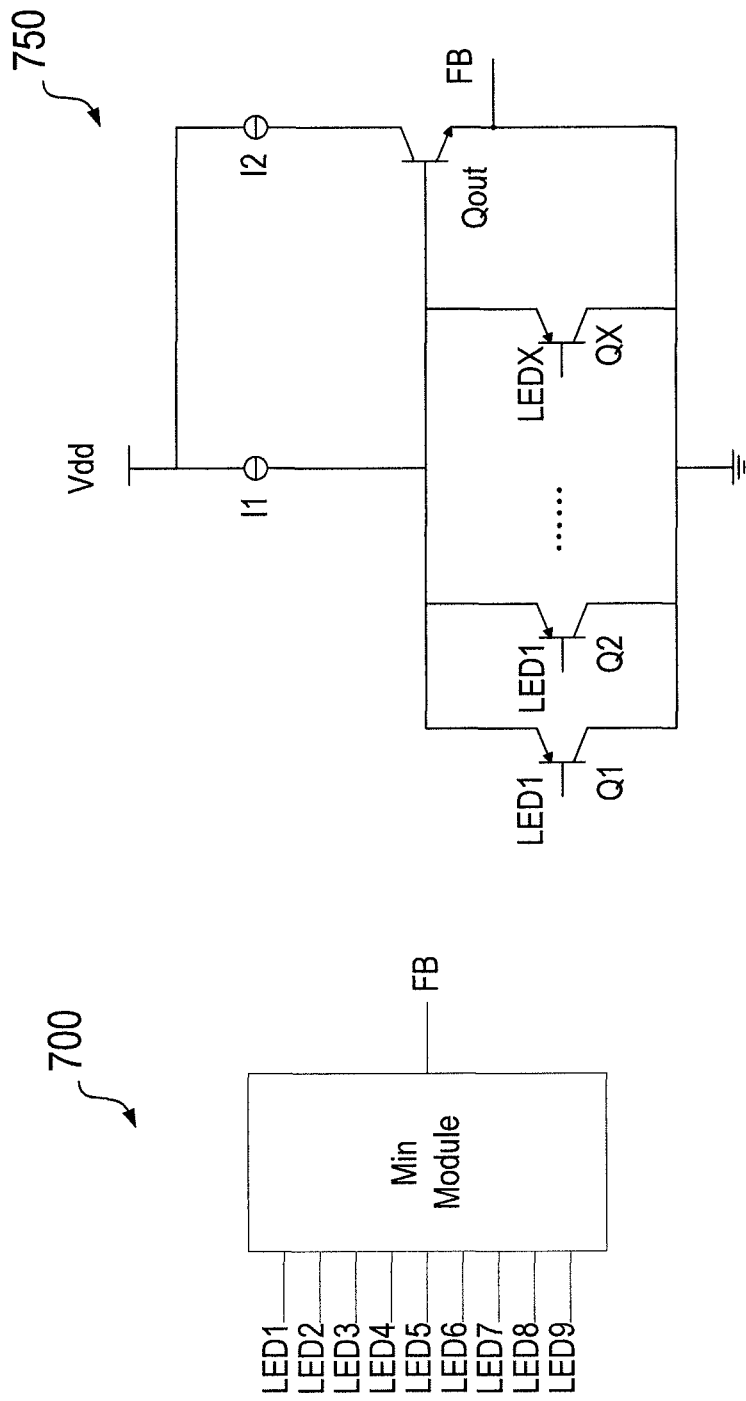
FIGS. 7A and 7B are, respectively, a simplified block diagram and a simplified circuit diagram illustrating an analog minimum circuit according to an embodiment of the present invention.

In circuit block 603, the lower limit voltage FBL and upper limit voltage FBH are associated with the range of LED cathode voltages when each of the LED strings is under a normal operating condition. In an embodiment, circuit block 603 may involve another circuit module (not shown in FIG. 6) for determining the lower limit voltage and the upper limit voltage. This circuit module a circuit that is configured to determine a reference voltage that is equal to the least of LED cathode voltages when the LED strings are in a normal operating condition, which can be implemented using, e.g., the minimum circuit module described above. An example of a minimum circuit module is depicted in FIGS. 7A and 7B and discussed below. The lower limit voltage can be set to be equal to the reference voltage minus a first offset voltage, and the higher limit voltage can be set to be equal to the reference voltage plus a second offset voltage.

FIG. 7A is a block diagram 700, and FIG. 7B is a simplified circuit diagram 750 illustrating an analog minimum circuit module according to an embodiment of the present invention. In FIG. 7A, minimum circuit module 70 is shown to have several input terminals, LED1-LED9, each of which is configured to be coupled to a cathode terminal of an LED string. Min module 70 also has an output terminal for providing a signal FB, which is related to the minimum of the input voltages. Circuit module 700 can be used as min module 402 in FIG. 4 or Min module 502 in FIG. 5.

FIG. 7B shows an exemplary circuit diagram for a minimum circuit module 750 according to an embodiment of the present invention. As shown, circuit module 750 includes a plurality of input transistors Q1, Q2, . . . , QX and an output transistor Qout. Each transistor has a control terminal configured for controlling a current flow between a first and a second current-carrying terminals. In the embodiment of FIG. 7B, each of input transistors Q1, Q2, . . . , QX is a PNP bipolar transistor, and output transistor Qout is an NPN bipolar transistor. In alternative embodiments, the minimum circuit module can also be implemented using MOS transistors. For example, PMOS transistors can be used as input transistors, and an NMOS transistor can be used as the output transistor.

In FIG. 7B, the control terminal for each bipolar transistor is the base terminal, which controls current flow between the collector terminal and the emitter terminal. In FIG. 7B, the base terminals of input transistors Q1-QX, are configured for coupling to input signals, for example, cathode voltages at the LED strings, LED1, LED2, . . . , and LEDX. As shown, the collector terminals of the input transistors are coupled to the base terminal of the output transistor. Moreover, a first current source I1 is coupled to the emitter terminals the input transistors. A second current source I2 is coupled to the collector terminal of output transistor Qout. As shown in FIG. 7B, the voltage at the base terminal of output transistor Qout is determined by the lowest voltage at the base terminals of input transistors Q1-QX. As a result, output signal at the FB signal will be substantially equal to the lowest input voltage.

Thus, a method and system for short-circuit protection of LED systems have been described using specific embodiments and examples. It is understood that the examples and embodiments described herein are for illustrative purposes only and that various modifications or changes in light thereof will be suggested to persons skilled in the art and are to be included within the spirit and purview of this application.

What is claimed is:

1. A circuit for determining a short-circuit condition in one or more LED strings, comprising:
   a first circuit module coupled to each of the one or more LED strings for determining a minimum voltage among voltages associated with the cathodes of the one or more LED strings;
   a second circuit module coupled to the first circuit module to receive the minimum voltage and to output an enable signal if the minimum voltage is between a lower limit voltage and an upper voltage limit; and
   one or more test circuit modules, each coupled to a corresponding LED string and also coupled to the second circuit module, each of the test circuit modules configured to test for a short circuit condition in the corresponding LED string if it receives the enable signal from the second circuit module.

2. The circuit of claim 1, wherein the first circuit module comprises:
   a plurality of input transistors, each of which having a control terminal configured for controlling a current flow between a first and a second current carrying terminals of the input transistor, the control terminals being configured for coupling to the LED strings;
   an output transistor having a control terminal configured for controlling a current flow between a first and a second current carrying terminals of the output transistor, the control terminal of the output transistor being coupled to the first terminals of the plurality of input transistors;
   a first current source coupled to the second terminals of the plurality of input transistors; and
   a second current source coupled to the first terminal of the output transistor;
   wherein the second terminal of the output transistor is configured to provide an output voltage associated with the minimum voltage associated with the voltages at the control terminals of the input transistors.

3. The circuit of claim 2, wherein each of the input transistors comprises a PNP bipolar transistor and the output transistor comprises an NPN bipolar transistor.

4. The circuit of claim 2, wherein each of the input transistors and the output transistor comprises an MOS transistor.

5. The circuit of claim 1, wherein the second circuit module comprises a comparator circuit having:
   an input terminal;
   a high voltage reference terminal;
   a low voltage reference terminal; and
   an output terminal;
   wherein the comparator circuit is configured to output an enable signal at the output terminal, if a voltage at the input terminal has a magnitude between those at the high voltage reference terminal and low voltage reference terminal.

6. The circuit of claim 1, wherein the lower limit voltage and the upper limit voltage are associated with the range of LED cathode voltages when each of the LED strings is under a normal operating condition.

7. The circuit of claim 1, further comprising a third circuit module for determining the lower limit voltage and the upper limit voltage, the third circuit module being configured to:
   determine a reference voltage that is equal to the least of LED cathode voltages when the LED strings are in a normal operating condition;
   set the lower limit voltage equal to the reference voltage minus a first offset voltage; and
   set the higher limit voltage equal to the reference voltage plus a second offset voltage.

8. The circuit of claim 1, wherein the first circuit module, the second circuit module, and the one or more test circuit modules are integrated in a single circuit module.

9. The circuit of claim 1, wherein each of the one or more test circuit modules comprises:
   a first resistive voltage divider circuit for coupling to a cathode terminal of an LED string and for providing a sampled LED cathode voltage;
   a second resistive voltage divider circuit for coupling to a voltage supply and providing a short-circuit reference voltage; and
   a comparator circuit having:
      a first input terminal for receiving the sampled LED cathode voltage;
      a second input terminal for receiving the short-circuit reference voltage;
      a control terminal for receiving the enable signal; and
      an output terminal for outputting a short-circuit indicating signal, if the enable signal is received and if the sampled LED cathode voltage is higher than the short-circuit reference voltage.

10. An LED display system, comprising:
    an LED array including one or more LED strings, each of the LED strings having a plurality of LED devices;
    a first circuit module coupled to each of the one or more LED strings for determining a minimum voltage among voltages associated with the cathodes of the one or more LED strings;
    a second circuit module coupled to the first circuit module to received the minimum voltage and for outputting an enable signal if the minimum voltage is between a lower limit voltage and an upper voltage limit; and
    one or more test circuit modules, each coupled to a corresponding LED string and also coupled to the second circuit module, each of the test circuit modules configured to test for a short circuit condition in the corresponding LED string if it receives the enable signal from the second circuit module.

11. The system of claim 10, wherein the first circuit module comprises:
    a plurality of input transistors, each of which having a control terminal configured for controlling a current flow between a first and a second current carrying terminals, the control terminals being configured for coupling to the LED strings;
    an output transistor having a control terminal configured for controlling a current flow between a first and a second current carrying terminal, the control terminal of the output transistor being coupled to the first terminals of the plurality of input transistors;
    a first current source coupled to the second terminals of the plurality of input transistors; and
    a second current source coupled to the first terminal of the output transistor;
    wherein the second terminal of the output transistor is configured to provide an output voltage associated with the minimum voltage associated with the voltages at the control terminals of the input transistors.

12. The system of claim 10, wherein the second circuit module comprises a comparator circuit having:
    an input terminal;
    a high voltage reference terminal;
    a low voltage reference terminal; and
    an output terminal;
    wherein the comparator circuit is configured to output an enable signal at the output terminal, if a voltage at the input terminal has a magnitude between those at the high voltage reference terminal and low voltage reference terminal.

13. The circuit of claim 10, wherein the lower limit voltage and the upper limit voltage are associated with the range of LED cathode voltages when each of the LED strings is under a normal operating condition.

14. The system of claim 10, further comprising a third circuit module for determining the lower limit voltage and the upper limit voltage, the third circuit module configured to:
    determining a reference voltage that is equal to the least of LED cathode voltages when the LED strings are in a normal operating condition;
    setting the lower limit voltage equal to the reference voltage minus a first offset voltage; and
    setting the higher limit voltage equal to the reference voltage plus a second offset voltage.

15. The system of claim 10, wherein each of the one or more test circuit modules comprises:
    a first resistive voltage divider circuit for coupling to a cathode terminal of an LED string and for providing a sampled LED cathode voltage;
    a second resistive voltage divider circuit for coupling to a voltage supply and providing a short-circuit reference voltage; and
    a comparator circuit having:
       a first input terminal for receiving the sampled LED cathode voltage;
       a second input terminal for receiving the short-circuit reference voltage;
       a control terminal for receiving an enable signal; and
       an output terminal for outputting a short-circuit indicating signal if the enable signal is received and if the sampled LED cathode voltage is higher than the short-circuit voltage.

* * * * *